June 12, 1923.
G. A. RICHTER
1,458,309
METHOD OF MAKING BISULPHITE COOKING LIQUOR
Filed Aug. 28, 1920
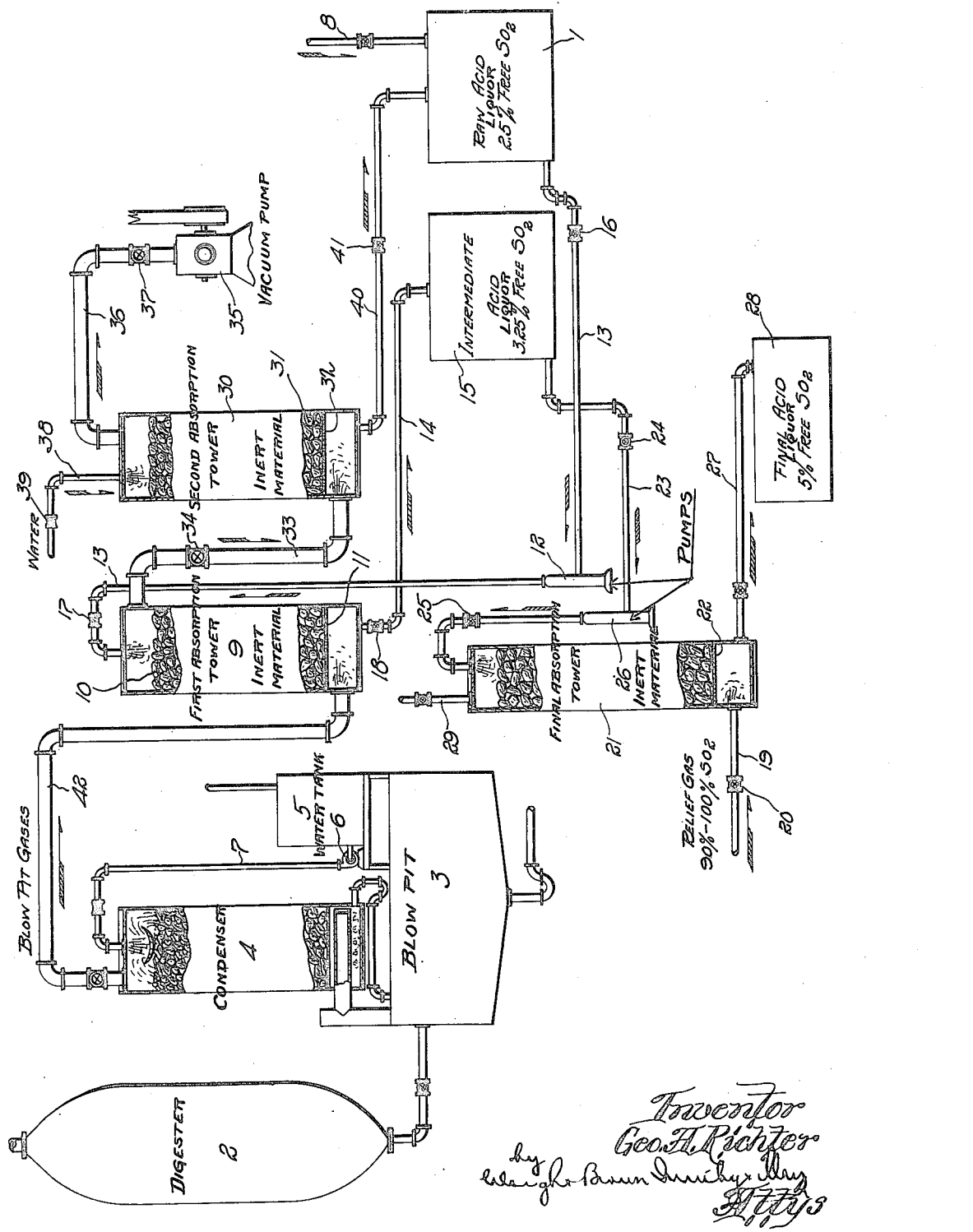

Patented June 12, 1923.

1,458,309

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

METHOD OF MAKING BISULPHITE COOKING LIQUOR.

Application filed August 28, 1920. Serial No. 406,644.

*To all whom it may concern:*

Be it known that I, GEORGE A. RICHTER, a citizen of the United States, residing at Berlin, in the county of Coos and State of New Hampshire, have invented new and useful Improvements in Methods of Making Bisulphite Cooking Liquor, of which the following is a specification.

This invention has relation to the manufacture of sulphite pulp, and particularly to the manufacture of the liquor which is employed in the digesters for cooking the raw material.

The object of the invention is primarily to produce a liquor having a predetermined high percentage of free sulphurous acid, and, by eliminating the necessity of refrigeration, to effect a marked economy in its production. A further object of the invention is to utilize sulphur dioxide recovered from the blow pit gases and the relief gases in making the finished acid liquor, and to economize the use of these gases by introducing them into the system at a point where they will be most efficient in increasing the free sulphur dioxide content in the cooking liquor during its preparation.

In the practice of the present invention, the cooking acid liquor, e. g., calcium bisulphite, is produced in three stages, i. e., what I term raw, intermediate and finished or final acid liquors. I shall describe the raw acid liquor as produced with a calcium base, but, in lieu thereof, magnesium or its equivalent may be employed, and hence I employ the term "calcium bisulphite" as intended to include its equivalent in the digestion of wood chips in the manufacture of sulphite pulp.

On the drawing, I have illustrated conventionally and diagrammatically those instrumentalities which may be employed for practicing my invention, and which I will now proceed briefly to describe. I may premise my description, however, with the statement that I have not illustrated the instrumentalities for burning a sulphur-bearing material for the production of sulphur dioxide, or the instrumentalities by which the products of combustion are initially cooled and employed in the manufacture of the raw acid liquor, or the apparatus for separating the gas from the relief liquor discharged from the digester during the cooking operation, as common forms of these various instrumentalities are on the market. So I will start with the assumption that, by means of a suitable absorption system in which calcium-bearing materials are employed (as, for instance, by the process described in my Letters Patent No. 1,378,616, dated May 17, 1921), a raw cooking acid liquor, e. g., calcium bisulphite, is produced containing about 1.2% combined and 2.5% free sulphur dioxide ($SO_2$), and that this raw material is received in a storage tank 1 from which it is drawn for purposes to be described. Starting with this raw acid liquor, it is in two additional stages converted to the final product having a high free $SO_2$ content, this being accomplished in the intermediate stage by the use of $SO_2$ recovered from the waste blow pit gases which comprise 50% to 60% $SO_2$, and in the final stage by relief gases from the digester which have an $SO_2$ strength of 90% to 100%. Certain economies are further effected by returning the tail gases, resulting in the intermediate and final stages, to the raw acid system for absorption therein.

A digester is shown at 2, and a blow pit at 3. The vapors and gases, liberted when the contents of the digester are blown, pass upwardly through a direct condenser 4, in which the vapors are condensed, and from which the blow pit gases (comprising 50% to 60% $SO_2$) are emitted through a gas conduit 42. I shall not herein describe the condenser in detail, as it forms the subject of my application Serial No. 405,915, filed August 25, 1920, but may point out briefly that it consists of a tower containing a mass of inert interstitial surface material through which water, delivered from a storage tank 5 by a pump 6 and pipe 7, is caused to trickle in numerous streams in counter-current flow to and in contact with the blow-pit gases and vapors, and is finally delivered into the blow pit at a temperature of about 200° F. and containing practically no dissolved $SO_2$.

The blow-pit gases are, as previously stated, employed to enrich with free $SO_2$ or sulphurous acid, the raw acid liquor contained in tank 1 and delivered thereto from the raw acid liquor system or towers (not shown) by a pipe 8. For this purpose, I employ a tower or chamber 9, in which is contained a mass of inert interstitial surface material 10 (e. g., spiral brick, fragments of field rock or the like), resting on a perforated grid or diaphragm 11. The raw acid liquor (which contains about 2.5% free and 1.2% combined $SO_2$) is pumped from the tank 1, by a pump 12, through the pipe 13 to the top of the tower or chamber 9, so that it will flow downwardly through the various tortuous passageways in the interstitial material. The blow-pit gases from the top of the condenser 4 are led to the bottom of tower 9 by pipe 42, and, flowing upwardly therethrough, are brought into direct contact with the raw acid liquor, with the result that such liquor is enriched with $SO_2$ to a point where it contains about 3.25% free and about 1.2% combined $SO_2$. This "intermediate" acid liquor, as I term it, is conducted by a pipe 14 to a storage tank 15. The pipe 13 has valves 16 and 17, and the pipe 14 has a valve 18 so that the passage of the liquor therethrough may be properly regulated from time to time.

The intermediate acid liquor is now enriched to its final form with gas from the relief system. The pipe 19, having a valve 20, conducts the relief gas (which it will be remembered comprises about 90% to 100% $SO_2$) to a tower 21 containing a mass of inert interstitial surface material resting on a perforated partition or grid 22. The intermediate acid liquor from tank 15 is forced through a pipe 23 (having valves 24 and 25) by a pump 26 to the top of the tower 21, to pass in contact with and in counter-current flow to the relief gases. The intermediate acid liquor is thus enriched to a point where it contains about 5% free and somewhat over 1% combined $SO_2$, and, being delivered by pipe 27 to storage tank 28, is now in final form ready for use in the digesters.

Obviously all of the gases delivered to the towers 9 and 21 are not completely robbed of sulphur dioxide. In fact, the tail gas from tower 9 usually contains about 20% to 25% $SO_2$, and, as this is approximately of the same strength as the burner gas, it may be employed for making the raw acid liquor; and likewise the tail gas from tower 21 contains about the same amount of $SO_2$ and it too can be employed for the same purpose. Thus the tail gas from both towers may be conducted to the raw acid liquor system to be commingled or mixed with the cooled burner gas before the latter is admitted to the absorption towers. Thus the pipe 29, for the tail gas from tower 21, may be connected with the burner gas pipe (not shown). For convenience, and for purposes of explanation and exemplification, I have illustrated at 30 a tower in which a raw acid liquor is produced by absorbing the tail gas from the tower 9. This tower 30 is provided with a mass of inert interstitial surface material 31, such as hereinbefore described, supported by a grid or perforated plate 32, and the tail gas from tower 9 is conducted to the lower end of tower 9 by a tail gas pipe 33 having a valve 34. The exit gas from tower 30 is withdrawn by suction pump 35 through pipe 36 (valved as at 37) leading from the top of the tower. This suction pump creates a reduced pressure or partial vacuum through the system as far back as the blow pit. Clear water is introduced to the top of tower 30 through pipe 38, having a valve 39, and the water and gas have a counter-current flow in direct contact through the tortuous passages afforded by the inert interstitial surface material. In its passage, the water absorbs sulphur dioxide, and, as delivered by the eduction pipe 40 (valved as at 41) to the raw acid liquor tank 1, has an $SO_2$ content of about 2.5%, which corresponds to the free $SO_2$ content of the raw acid liquor in such tank.

From the foregoing description, it will be seen that the raw bisulphite liquor is enriched with free sulphurous acid or sulphur dioxide, to an intermediate acid liquor by sulphur dioxide recovered from the blow-pit gases, and is further enriched to its final state by the very strong relief gas from the digester, and that the tail gases from the intermediate and final stages are utilized in the first stage of making or producing the raw liquor.

In carrying out my system, I have utilized the knowledge that the final concentration of free $SO_2$ in solution depends upon three factors; namely, the temperature of the solution, the pressure exerted by the gas upon it, and the strength in $SO_2$ of the gas. For example, sulphur-burner gases, comprising about 18% $SO_2$, will give a free acid content in the solution of about 2.5% at 20° C. According to the process as I have described it, the percentage of free $SO_2$ in solution is increased by subjecting the gradually enriched solution to increasingly strong or concentrated gas. Assuming that the gas from the blow pit entering tower 9 has a 60% $SO_2$ content, it leaves with a 25% $SO_2$ content, so that the absorption equals 78% of the contained $SO_2$. (The remainder of the $SO_2$ is absorbed in tower 30, or is absorbed in the initial absorption system if delivered to the burner gas pipe leading to the raw acid absorption towers.) There is enough $SO_2$ in the blow-pit gases to bring (by a 78% absorption) the free $SO_2$ content of the raw acid liquor from 2.5% to 3.25% $SO_2$ in the intermediate acid tower. This, in like manner, is enriched or converted by the strongly concentrated relief gas, to the final or finished acid liquor having an $SO_2$ content of about 5%, this all being accomplished by the use of water at seasonable temperatures and without refrigeration.

If it is desirable that refrigeration be employed either for the raw acid liquor or at some other part of the system, the free $SO_2$ content of the finished bisulphite liquor can be correspondingly increased to about 6% free $SO_2$.

What I claim is:—

1. In the manufacture of sulphite cooking liquor for use in producing sulphite pulp, the following steps, comprising enriching the raw acid liquor with free sulphur dioxide by recovered blow-pit gas to produce an intermediate acid liquor having a greater free sulphur dioxide content, and producing a final acid liquor having an increased free sulphur dioxide content by enriching the intermediate acid liquor with relief gas from the digester.

2. In the manufacture of sulphite cooking liquor for use in producing sulphite pulp, the following steps, comprising treating raw acid liquor with recovered blow-pit gases to produce an intermediate acid liquor having approximately 3.25% free sulphur dioxide, and treating such intermediate acid liquor with a substantially pure sulphur dioxide gas to produce a final acid liquor having a high content of free sulphur dioxide.

3. In the manufacture of sulphite cooking liquor for use in producing sulphite pulp, the following steps, comprising treating raw acid liquor having approximately a 2.5% free sulphur dioxide content with mixed gases comprising about 50% to 60% sulphur dioxide to produce an intermediate acid liquor with a predetermined increased content of sulphur dioxide, and finally treating such intermediate acid liquor with a substantially pure (say 90% to 100%) sulphur dioxide gas, to produce a final acid liquor having a high content of free sulphur dioxide.

4. In the manufacture of sulphite cooking liquor for use in producing sulphite pulp, the following steps, comprising treating raw acid liquor, produced by the reaction of sulphur dioxide with lime in the presence of water, with recovered blow-pit gases to produce an intermediate acid liquor having approximately 3.25% free sulphur dioxide, and treating such intermediate acid liquor with relief gas from the digesters to produce a final acid liquor having a free sulphur dioxide content of approximately 5%.

5. In the manufacture of sulphite cooking liquor for use in producing sulphite pulp, the following steps, comprising recovering the blow-pit gases, passing a calcium bisulphite liquor into contact with said gas, thereby causing the production of an intermediate acid liquor having an enriched free sulphur dioxide content, recovering relief gases from a digester, and passing such intermediate acid liquor into contact with said relief gas, thereby causing the production of a final calcium bisulphite liquor having an increased high content of free sulphur dioxide.

6. The herein described process in the manufacture of sulphite pulp, which comprises recovering the blow-pit gases, passing such gases through absorption towers in series, passing a calcium bisulphite solution having a low free sulphur dioxide content through the first of said towers to increase the free sulphur dioxide content thereof, and passing water through the second of said towers to produce an acid liquor having a free sulphur dioxide content approximating that of the first-mentioned solution.

7. The herein described process in the manufacture of sulphite cooking liquor, comprising the following steps:—recovering the blow-pit gases by passing such gases through absorption towers in series, passing a calcium bisulphite solution having a low free sulphur dioxide content through the first of said towers to increase its free sulphur dioxide content, passing water through the second of said towers to produce an acid solution having a free sulphur dioxide content approximating that of the first-mentioned solution, mixing the last two mentioned solutions for treatment in the first said tower with the aforesaid recovered blow-pit gas, and passing the enriched solution from the first said tower into contact with relief gas from the digester, thereby producing a calcium bisulphite solution with a high content of free sulphur dioxide.

8. The herein described process in the manufacture of sulphite cooking liquor, which comprises recovering the blow-pit gases, passing such gases through absorption towers in series, passing a calcium bisulphite solution having a low free sulphur dioxide content through the first of said towers to increase its free sulphur dioxide content, passing water through the second of said towers to produce an acid liquor having a free sulphur dioxide content approximating that of the first-mentioned solution, and mixing the two last-mentioned solutions for treatment in the said first tower with recovered blow-pit gas.

In testimony whereof I have affixed my signature.

GEORGE A. RICHTER.